(12) United States Patent
Yarbrough

(10) Patent No.: US 8,262,362 B2
(45) Date of Patent: Sep. 11, 2012

(54) WIND TURBINE BLADE SHEAR WEB WITH SPRING FLANGES

(75) Inventor: Aaron Yarbrough, Clemson, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/155,791

(22) Filed: Jun. 8, 2011

(65) Prior Publication Data

US 2012/0027610 A1 Feb. 2, 2012

(51) Int. Cl.
*F03D 11/00* (2006.01)
(52) U.S. Cl. .................. 416/226; 29/889.7; 29/527.1
(58) Field of Classification Search .............. 416/226, 416/232; 29/889.7, 889.71, 889.72, 527.1
See application file for complete search history.

(56) References Cited

U.S. PATENT DOCUMENTS

| | | | |
|---|---|---|---|
| 2,503,450 A | 4/1950 | Nebesar | |
| 3,771,748 A | 11/1973 | Jones | |
| 4,643,646 A | 2/1987 | Hahn et al. | |
| 5,476,704 A * | 12/1995 | Kohler | 428/119 |
| 6,234,423 B1 | 5/2001 | Hirahara et al. | |
| 6,513,757 B1 | 2/2003 | Amaoka et al. | |
| 6,520,706 B1 | 2/2003 | McKague et al. | |
| 6,800,956 B2 | 10/2004 | Bartlett | |
| 6,964,723 B2 * | 11/2005 | Lindsay et al. | 156/285 |
| 7,037,568 B1 | 5/2006 | Rogers et al. | |
| 7,179,059 B2 | 2/2007 | Sorensen et al. | |
| 7,244,487 B2 * | 7/2007 | Brantley et al. | 428/119 |
| 7,258,828 B2 * | 8/2007 | Fish | 264/257 |
| 7,371,304 B2 | 5/2008 | Christman et al. | |
| 7,393,488 B2 * | 7/2008 | Grose et al. | 264/254 |
| 7,625,623 B2 | 12/2009 | Grose et al. | |
| 7,810,757 B2 | 10/2010 | Kirkwood et al. | |
| 7,841,835 B2 | 11/2010 | Bagepalli et al. | |
| 7,897,095 B2 | 3/2011 | Raeckers | |
| 8,075,275 B2 | 12/2011 | Althoff et al. | |
| 2003/0037867 A1 | 2/2003 | Bersuch et al. | |
| 2006/0225278 A1 * | 10/2006 | Lin et al. | 29/889.72 |
| 2007/0036659 A1 | 2/2007 | Hibbard | |
| 2007/0110584 A1 | 5/2007 | Stommel | |
| 2009/0087318 A1 | 4/2009 | Althoff et al. | |
| 2010/0135815 A1 * | 6/2010 | Bagepalli et al. | 416/226 |
| 2010/0135817 A1 | 6/2010 | Wirt et al. | |
| 2010/0143143 A1 | 6/2010 | Judge | |
| 2010/0162567 A1 | 7/2010 | Kirkwood et al. | |

(Continued)

FOREIGN PATENT DOCUMENTS

WO WO 2009/155920 A1 12/2009

*Primary Examiner* — Edward Look
*Assistant Examiner* — Christopher R Legendre
(74) *Attorney, Agent, or Firm* — Dority & Manning, P.A.

(57) ABSTRACT

A wind turbine blade has upper and lower shell members with a respective spar cap configured on an internal face of the shell members. A shear web extends between the spar caps along a longitudinal length of the blade. A connection assembly is configured between the transverse ends of the shear web and the spar caps. The connection assembly includes spring flange members that extend distally beyond the transverse ends of the shear web at opposite sides of the shear web so as to define a laterally extending float section. A bond paste layer is between the float sections and the spar cap and between the transverse end of the shear web and the spar cap as a result of compression of the spring flanges against the spar cap.

12 Claims, 4 Drawing Sheets

U.S. PATENT DOCUMENTS

| | | |
|---|---|---|
| 2011/0008175 A1* | 1/2011 | Gau ............................. 416/233 |
| 2011/0081247 A1 | 4/2011 | Hibbard |
| 2011/0142663 A1* | 6/2011 | Gill ............................. 416/226 |
| 2011/0176928 A1* | 7/2011 | Jensen ......................... 416/233 |
| 2012/0027610 A1* | 2/2012 | Yarbrough ................... 416/226 |
| 2012/0027612 A1* | 2/2012 | Yarbrough ................... 416/226 |
| 2012/0027613 A1* | 2/2012 | Yarbrough ................... 416/226 |
| 2012/0027614 A1* | 2/2012 | Yarbrough ................... 416/226 |
| 2012/0027615 A1* | 2/2012 | Irizarry-Rosado et al. ... 416/226 |

\* cited by examiner

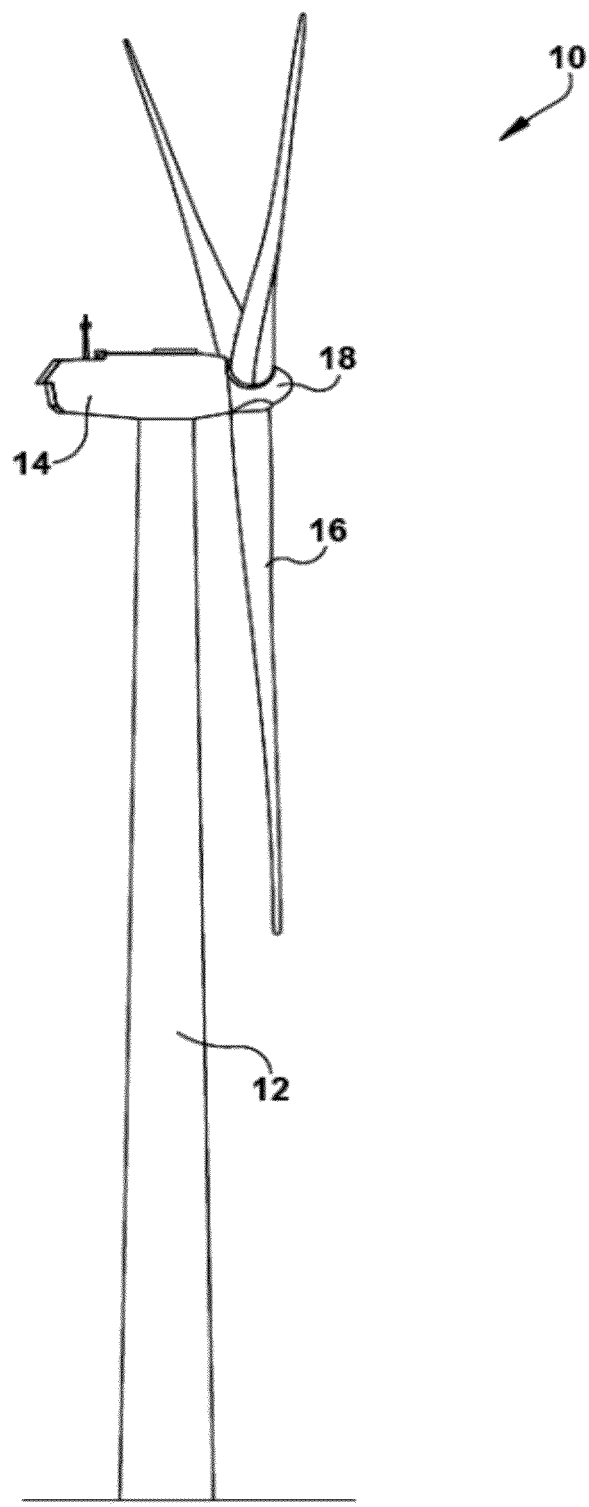
Fig. -1-
Prior Art

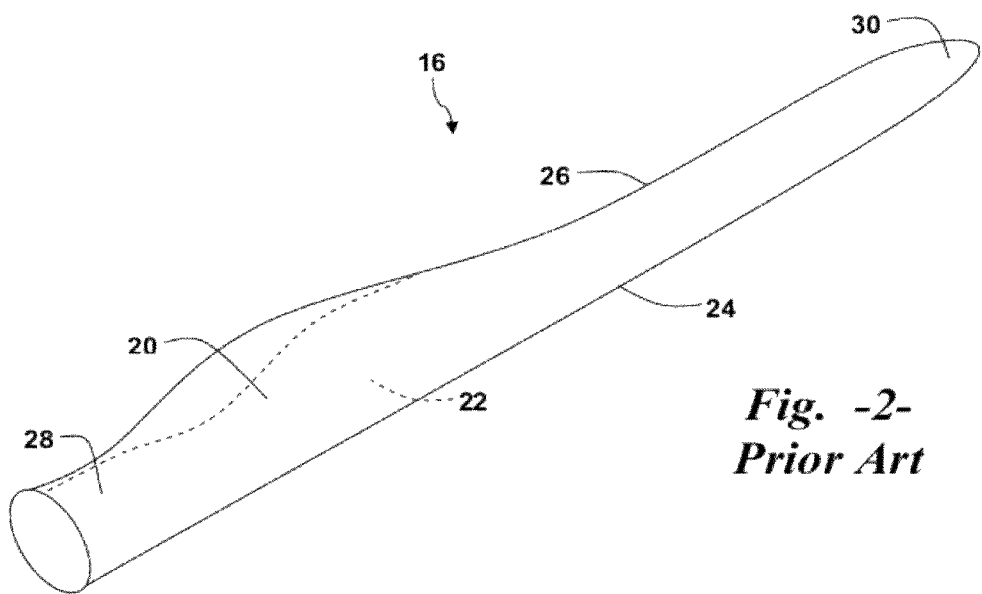
*Fig. -2-*
*Prior Art*
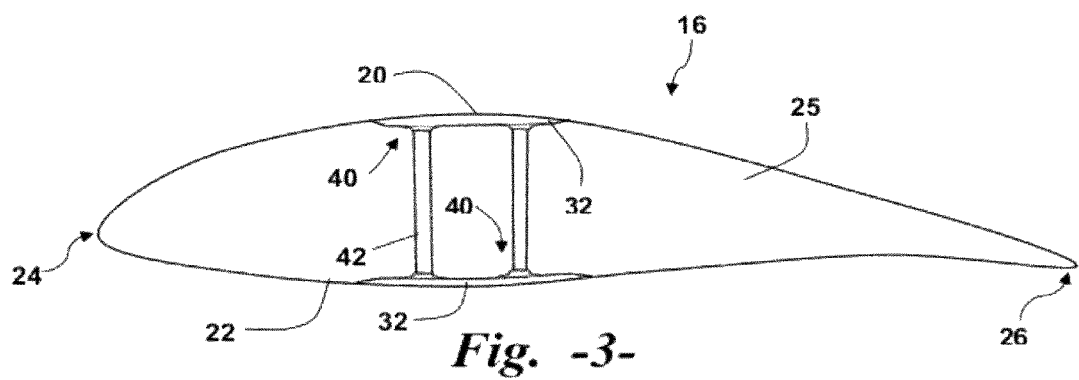
*Fig. -3-*

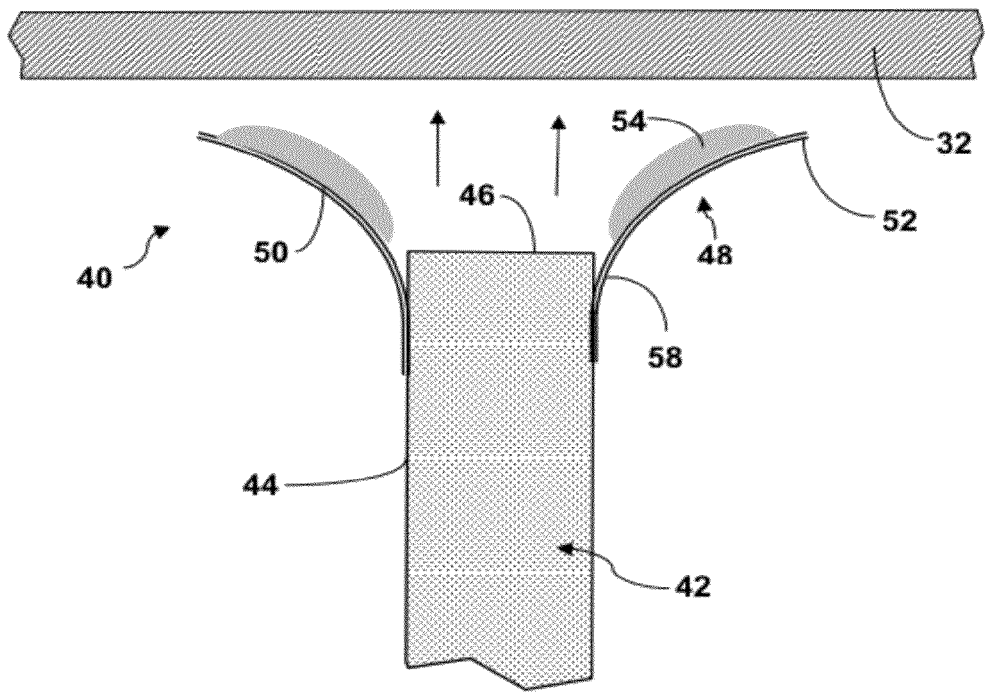
*Fig. -4-*
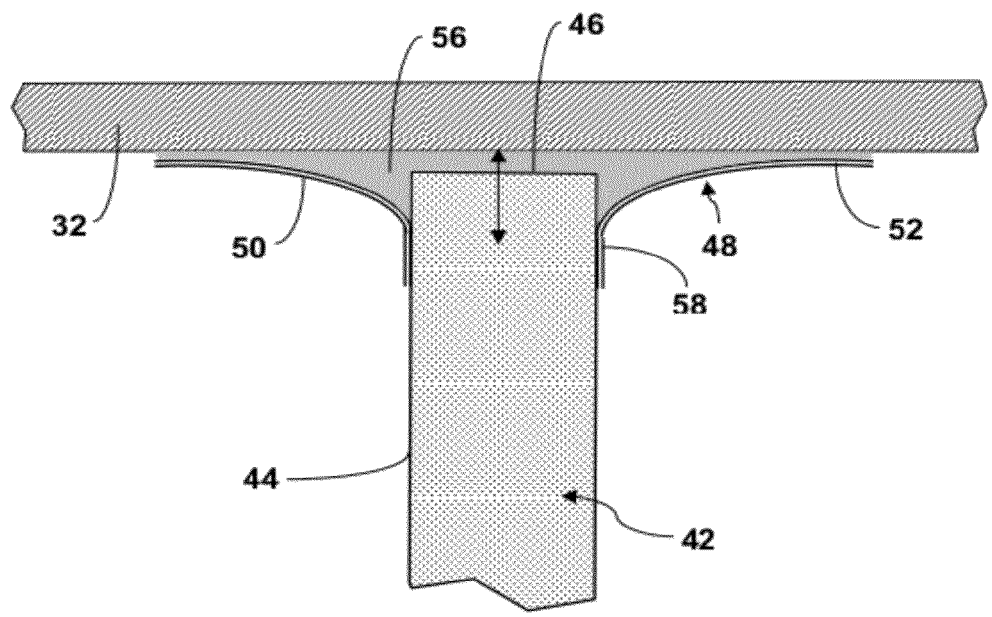
*Fig. -5-*

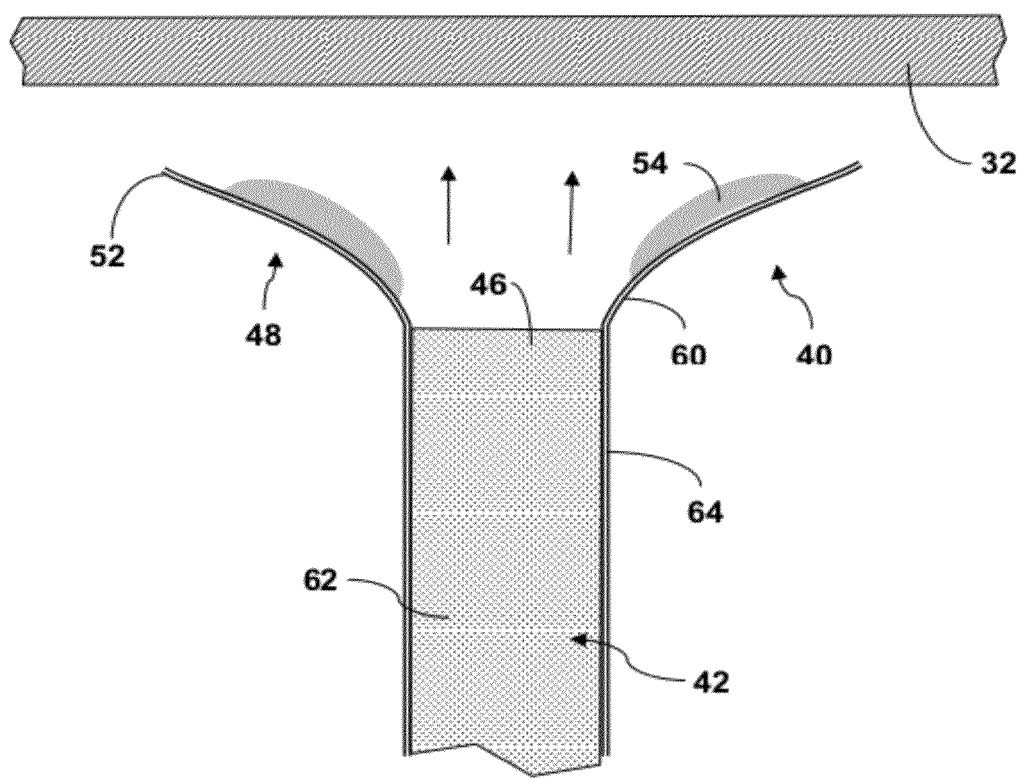
Fig. -6-

WIND TURBINE BLADE SHEAR WEB WITH SPRING FLANGES

FIELD OF THE INVENTION

The present invention relates generally to the field of wind turbines, and more particularly to the shear web assembly within the wind turbine blades.

BACKGROUND OF THE INVENTION

Turbine blades are the primary elements of wind turbines for converting wind energy into electrical energy. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

The turbine blades typically consist of a suction side shell and a pressure side shell that are bonded together at bond lines along the trailing and leading edges of the blade. An internal shear web extends between the pressure and suction side shell members and is bonded to spar caps affixed to the inner faces of the shell members. With typical blade constructions, a rigid flange is used to achieve a desired bond width for bond paste applied between the spar caps and transverse ends of the shear web. This configuration, however, often results in the use of excess bond paste to achieve the bond width. The excess paste contributes unnecessary weight to the blade and can break off and result in blade "rattling" during operation of the wind turbine (a not uncommon complaint from wind turbine owners/operators). Also, air voids and unpredictable squeeze-out of the bond paste in the typical construction can result in areas of decreased bond strength, which is particularly problematic in sections of the blade where repair is not possible from within the blade.

Accordingly, the industry would benefit from an improved bond configuration between the shear web and spar caps that addresses one or more of the deficiencies of certain conventional configurations.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine blade includes an upper shell member having a spar cap configured on an internal face thereof, and a lower shell member having a spar cap configured on an internal face thereof. A shear web extends between the spar caps along a longitudinal length of the blade. A connection assembly is provided between transverse ends of the shear web and the spar caps. This connection assembly includes spring flange members that extend distally beyond the transverse ends of the shear web at opposite sides of the shear web so as to define a laterally extending float section. The float sections may, in certain embodiments, have an arcuate shape where they merge with the shear web sides caused by compression of the spring flanges against the spar cap. A bond paste layer extends between the float sections and the spar cap and between the transverse ends of the shear web and the spar cap as a result of compression of the spring flanges against the spar cap. In particular embodiments, the bond paste layer may be continuous under the float sections and transverse end of the shear web.

The spring flanges may be variously configured. In a particular embodiment, the spring flanges are components that are attached to the sides of the shear web prior to compression of the spring flanges against the spar cap. For example, the spring flanges may be flexible sheets attached to the sides of the shear web.

In another embodiment, the spring flanges may be defined by extensions of the shear web sides beyond a center core member. For example, the shear webs may have a skin, such as a laminate layer, applied over the center core member, with extensions of the skin defining the spring flanges.

The spring flanges may run continuously or intermittently along the length of the shear web.

The present invention also encompasses various method embodiments for assembling a shear web to spar caps in a wind turbine blade. One such method includes configuring spring flanges on opposite sides of the shear web, the spring flanges having a flexible float section that extends distally away from the transverse end of the shear web. A bond paste is applied between the spring flanges and a spar cap affixed to an internal face of an upper or lower shell member. The transvers end of the shear web is fixed to the spar cap by compressing the spring flanges against the spar cap such that the float sections flatten out against the spar cap and the bond paste is caused to distribute continuously between the float sections and spar cap.

In a particular method, the spring flanges are separate members that are attached to opposite sides of the shear web prior to placement of the shear web between the spar caps. In a different embodiment, the spring flanges are defined as extensions of the sides of the shear web distally beyond a center core member.

In certain methods, the bond paste is applied as a measured amount to each of the spring flanges prior to compression of the spring flanges against the spar cap. In other methods, the bond paste is applied to the spar cap and distributed by compression of the flanges against the spar cap. The degree of compression may be controlled so that the bond paste does not migrate out from under the float sections.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which:

FIG. 1 is a perspective view of a conventional wind turbine;

FIG. 2 is a perspective view of a conventional wind turbine blade;

FIG. 3 is a cross-sectional view of an exemplary wind turbine blade incorporating aspects of the invention;

FIG. 4 is an enlarged cross-sectional component view of a connection assembly between a shear web and spar cap in accordance with an embodiment of the invention;

FIG. 5 is an enlarged cross-sectional view of the embodiment of FIG. 4; and,

FIG. 6 is an enlarged cross-sectional component view of an alternate embodiment of a connection assembly.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

FIG. 2 is a more detailed view of a wind turbine blade 16. The blade 16 includes an upper shell member 20 and a lower shell member 22. The upper shell member 20 may be configured as the suction side surface of the blade 16, while the lower shell member 22 may be configured as the pressure side surface of the blade. The blade 16 includes a leading edge 24 and a trailing edge 26, as well as a root portion 28, and a tip portion 30. As is well known in the art, the upper shell member 20, and lower shell member 22 are joined together at the leading edge 24 and trailing edge 26. The blade 16 includes an internal cavity 25 (FIG. 3) in which various structural members, such as spar caps 32 and one or more shear webs 42, are configured, as is generally known in the art and need not be described in greater detail herein.

FIG. 3 is a cross-sectional view of a wind turbine blade 16 that incorporates aspects of the invention. The blade 16 includes one or more internal structural shear webs 42 that span between the upper 20 and lower shell members 22. In particular, the shear webs 42 are connected to structural spar caps 32 that are fixed to the internal faces of the shell members 20, 22. In accordance with aspects of the invention, an improved connection assembly 40 is provided at the interface of the shear webs 42 and spar caps 32, as described in greater detail below.

FIGS. 4 and 5 depict an embodiment of a connection assembly 40 wherein spring flange members 48 extend distally beyond transverse end 46 of the shear web 42 on opposite sides 44 of the shear web. These spring flange members 48 are formed of any suitable pliant, flexible material having properties suitable for the rigors and environment of a wind turbine blade. The spring flange members 48 may, for example, be formed of a flexible glass/fiber net material, laminate or composite materials, and so forth. In the embodiment of FIG. 4, the spring flange members 48 are defined by separate material components, such as laminate sheets, that are adhered or otherwise attached to the sides 44 of the shear web 42.

Still referring to FIG. 4, the spring flange members 48 define a float section 50 between an end 52 thereof and the point of attachment with the side 44 of the shear web 42.

FIG. 5 depicts the embodiment of FIG. 4 in its attached configuration with the spar cap 32. A bond paste layer 56 is defined between the float sections 50 and the spar cap 32, as well as between the transverse end 46 of the shear web 42 and the spar cap 32 in this particular embodiment. The float sections 50 spread laterally outward relative to the shear web sides 44 upon compression of the spring flanges 48 against the spar cap 32. Thus, the sections 50 "float" laterally away from the shear web sides 44 on the bond paste 54, and assume an arcuate profile or shape where they merge with the shear web side 44. The profile of the float section 50 tends to flatten out towards the end 52 of the spring flange member 48, as particularly depicted in FIG. 5.

Referring to FIG. 5, it should be appreciated that the ability of the spring flange members 48 to move laterally away from the shear web sides 44 upon compression of the spring flange members 48 provides a beneficial degree of dimensional tolerance between the transverse end 46 of the shear web 42 and the spar cap 32, as indicated by the arrow in FIG. 5. Thus, it is not absolutely necessary that the shear web 42 be defined with exact dimensions in order for the transverse ends 46 to abut directly against the spar cap 32. The flexible spring flange members 48 function to accommodate at least a certain degree of dimensional space between the transverse end 46 and the spar cap 32, while at the same time supporting the shear web 42 relative to the spar cap 32.

Still referring to FIG. 5, the bond paste 54 (FIG. 4) spreads upon compression of the spring flanges 48 into a generally continuous bond paste layer 56 under the float sections 50 and the transverse end 46 of the shear web 42. The bond paste 54 may be applied in various ways. For example, in the embodiment depicted in FIG. 4, a measured amount of bond paste 54 is applied to the underside of each of the spring flange members 48. Upon compression of the spring flange members against the spar cap 32, the bond paste 54 is caused to migrate and spread into the uniform bond paste layer 56 as depicted in FIG. 5. Preferably, the measured amount of bond paste 54 and degree of compression of the spring flanges 48 is controlled so that the bond paste 54 does not migrate out from under the spring flanges 48, as depicted in FIG. 5. In the event that some of the bond paste 54 does migrate out from under the spring flange member 48, the excess bond paste can be readily removed prior to the bond paste curing.

In an alternative embodiment not illustrated in the figures, the measured amount of bond paste 54 may be applied to the spar caps 32 at the designated point of attachment of the shear webs 42. In an alternative embodiment, the bond paste 42 may be applied to the spar cap 32 as well as to the spring flange members 48.

In FIG. 5, the bond paste layer 56 is depicted as a continuous layer between the opposite ends 52 of the respective spring flange members 48. It should be appreciated that it is also within the scope and spirit of the invention that the bond paste layer 56 be discontinuous. For example, there may be instances wherein a space or void is desired in the bond paste layer 56, for example under the transverse end 46 of the shear web 42. Because the spring flange members 48 provide a relatively wide bonded surface area footprint for the bond attachment between the shear web 42 and spar cap 32, voids or spaces in the bond paste layer 56 are more readily tolerated as compared to conventional configurations.

FIG. 6 depicts an alternative embodiment of a connection assembly 40 wherein the spring flange members 48 are defined by extensions of the side material of the shear web 42.

In particular, the side extensions 60 may be distal extensions of a skin material 64 that surrounds a central foam core member 62. The skin 64 may be, for example, a bi-axial fiber net or laminate material that is provided in a sufficient length so as to extend distally beyond the transverse end 46 of the shear web, as indicated in FIG. 6. Thus, in this embodiment, a separate point of attachment between the spring flange members 48 and the sides of the shear web 42 is eliminated.

The present invention also encompasses various method embodiments for assembling a shear web 42 to spar caps 32 within a wind turbine blade, as generally discussed above. For example, in a particular method embodiment, spring flanges 48 are configured on opposite sides 44 of a shear web 42, with the spring flanges 48 having a flexible float section 50 that extends distally away from the transverse end 46 of the shear web 42. A bond paste 54 is applied between the spring flanges 48 and a spar cap 32 affixed to the internal face of upper and lower shell members of the wind turbine blade. The transverse end 46 of the shear web 42 is fixed to the spar cap 32 by compressing the spring flanges against the spar cap 32 such that the float sections 50 flatten out against the spar cap 32 and the bond paste is caused to distribute generally continuously between the float sections 50 and spar cap 32, as discussed above.

Embodiments of the method may include attaching separate material spring flanges 48 to the opposite sides 44 of the shear web 42 prior to placement of the shear web 42 between the spar caps 32. In an alternative embodiment, the method may include configuring the spring flanges 48 as extensions of the side material layers of the shear web 42 distally beyond a center core member 62.

The method may further include providing the bond paste in a measured amount and compressing the spring flanges 48 to such a degree that the bond paste is not allowed to migrate out from under the float sections 50 in the assembly process. The bond paste 54 may be applied to the underside of the spring flanges 48, to the spar cap 32, or at both of these locations.

The present invention also encompasses any configuration of a wind turbine 10 (FIG. 1) wherein at least one of the blades 16 is configured with the unique advantages of the invention as discussed above.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wind turbine blade, comprising:
    an upper shell member having a spar cap configured on an internal face thereof;
    a lower shell member having a spar cap configured on an internal face thereof;
    a shear web extending between said spar caps along a longitudinal length of said blade;
    a connection assembly between transverse ends of said shear web and said spar caps, said connection assembly further comprising:
        spring flange members that extend distally beyond said transverse ends of said shear web at opposite sides of said shear web so as to define a laterally extending float section with a lateral end that extends onto said spar cap; and,
        a bond paste layer between said float sections and said spar cap and between said transverse ends of said shear web and said spar cap, said bond past layer extending continuously between opposite lateral ends of said spring flange members.

2. The wind turbine blade as in claim 1, wherein said spring flanges are separate components attached to said shear web sides.

3. The wind turbine blade as in claim 1, wherein said spring flanges are defined by extensions of said shear web sides beyond a center core member.

4. The wind turbine blade as in claim 1, wherein said spring flanges run continuously along the length of said shear web.

5. A method for assembling a shear web to spar caps in a wind turbine blade, comprising:
    configuring spring flanges on opposite sides of a shear web, the spring flanges having a flexible float section that extends distally away from the transverse end of the shear web;
    applying bond paste between the spring flanges and a spar cap affixed to an internal face of an upper or lower shell member; and,
    fixing the transverse end of the shear web to the spar cap by compressing the spring flanges against the spar cap such that the float sections flatten out against the spar cap and the bond paste is caused to distribute continuously between the float sections and spar cap.

6. The method as in claim 5, comprising attaching the spring flanges to the opposite sides of the shear web prior to placement of the shear web between the spar caps.

7. The method as in claim 5, wherein said spring flanges are configured as extensions of the sides of the shear web distally beyond a center core member.

8. The method as in claim 5, wherein the bond paste is applied as a measured amount to each of the spring flanges prior to compression of the spring flanges against the spar cap.

9. The method as in claim 5, wherein the bond paste is distributed as a continuous layer under the float sections and transverse end of the shear web.

10. The method as in claim 6, wherein the spring flanges are not compressed to such a degree that causes the bond paste to migrate out from under the float sections.

11. The method as in claim 7, wherein the bond paste is initially applied in a measured amount to each of said float sections prior to compressing the float sections against the spar cap.

12. The method as in claim 5, wherein the bond paste is initially applied in a measured amount to the spar cap prior to compressing the float sections against the spar cap.

* * * * *